No. 687,665. Patented Nov. 26, 1901.
J. E. SPRAIN.
PLOW.
(Application filed May 4, 1901.)
(No Model.) 2 Sheets—Sheet 2.
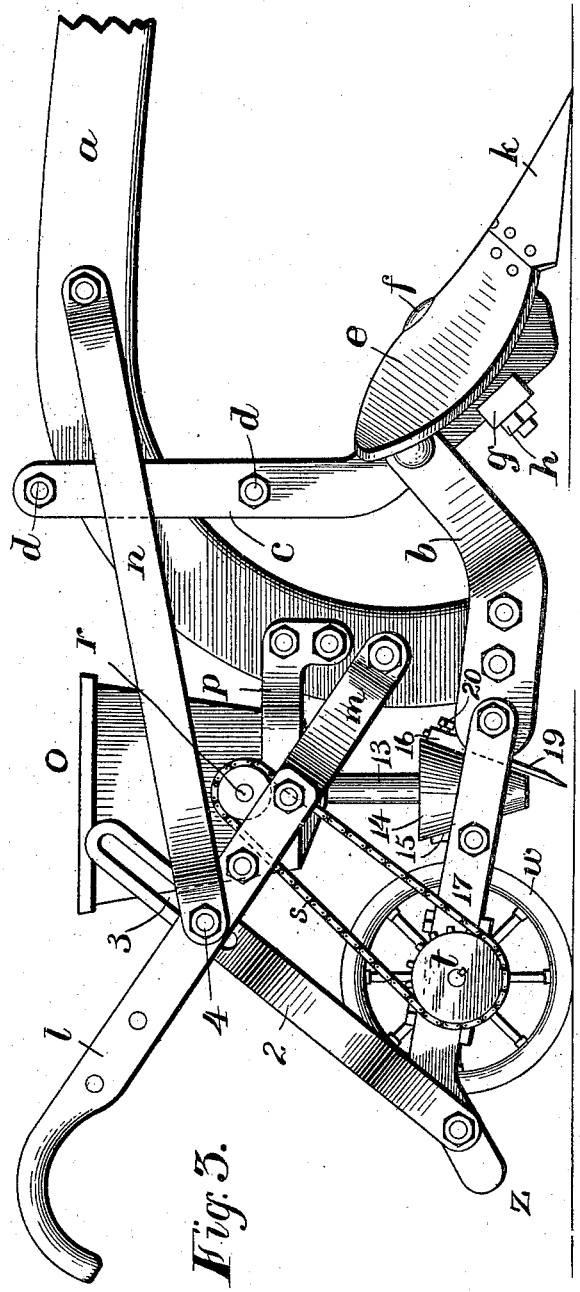
Witnesses
Percy C. Bowen
[signature]
Inventor
J. E. Sprain
by Wilkinson & Fisher
Attorneys

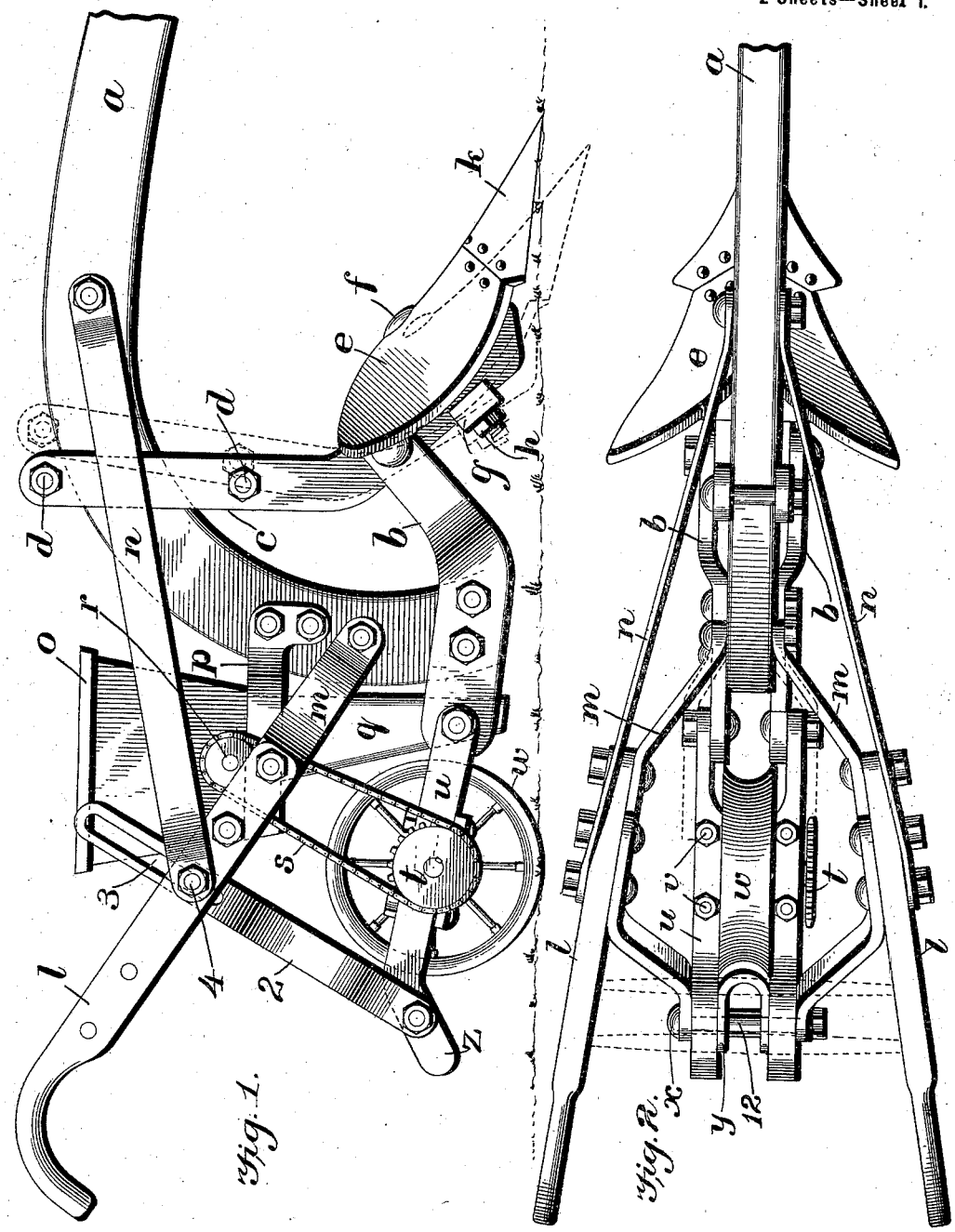

UNITED STATES PATENT OFFICE.

JOSEPH EDWARD SPRAIN, OF LEVI, TEXAS.

PLOW.

SPECIFICATION forming part of Letters Patent No. 687,665, dated November 26, 1901.

Application filed May 4, 1901. Serial No. 58,795. (No model.)

*To all whom it may concern:*

Be it known that I, JOSEPH EDWARD SPRAIN, a citizen of the United States, residing at Levi, in the county of McLennan and State of Texas, have invented certain new and useful Improvements in Plows; and I do hereby declare the following to be a full, clear, and exact description of the invention, such as will enable others skilled in the art to which it appertains to make and use the same.

My invention relates to improvements in combined plows and planters; and the object of my invention is to provide an implement which can be used either as a plow or as a plow and planter combined, which implement shall be cheap, compact, and serviceable.

With this object in view my invention consists in the construction and combination of parts, as hereinafter described and claimed.

In the accompanying drawings, Figure 1 is a side elevation of my improved plow and planter combined. Fig. 2 is a top view thereof. Fig. 3 is a side elevation of the plow and planter, showing a modification of the seed-distributing device; and Fig. 4 is a longitudinal section through the lower part of Fig. 3, parts being broken away.

$a$ represents the plow-beam, curved, as shown, and provided with holes, to which various parts of the apparatus are attached by bolts.

$b$ represents two frames, similar in shape, bolted to the lower part of the plow-beam. To each of these frames is pivoted a bent arm or standard $c$, one of said arms being located on each side of the plow-beam $a$, but not attached thereto. Bolts $d$, one above and one below the plow-beam, serve to limit the movement of the arms $c$, which may be adjusted on the plow-beam.

$e$ represents the moldboards, which by means of the bolt $f$, washer $g$, and nut $h$ are firmly attached to the frog $j$, located between the moldboards and the arms $c$. These arms $c$ are kept at the proper distance apart by means of a spacing-block $i$ and a thimble 8 on a shaft or bolt 9, which passes through the arms $c$.

To the beam $a$ are fastened the similarly-shaped bent arms $m$, to which the plow-handles $l$ are bolted. These plow-handles are of the usual shape and preferably made of wood; but all the other parts of the device are made of metal, either iron or steel.

$o$ represents a box or receptacle in which the seed, either with or without a fertilizer, as may be preferred, is placed. Bent arms $p$, one on each side of the plow-beam to which said arms are bolted, serve to support said receptacle, which is provided with a discharge-spout $q$, located directly behind the plow-point and directly and immediately in front of the covering-wheel $w$. This wheel $w$ is mounted or journaled in the arms $u$, each having a downward projection $z$. On the same shaft with the wheel $w$ is mounted or journaled a sprocket-wheel $t$, which by means of the sprocket-chain $s$ and sprocket-wheel $r$, mounted on the receptacle $o$, serves to feed the seed as the wheel $w$ revolves. Of course the receptacle $o$ is provided with any suitable device (not shown) for feeding the seed regularly and in the desired quantities. A wheel provided with pockets in its periphery or any other well-known device could be used for this purpose.

Braces 2 run from the parts $z$ of the arms $u$ up to the handles $l$. These braces are provided with slots 3, by means of which they may be adjusted in any desired position, thus raising the wheel $w$ or lowering it, as desired. These slots are arranged to pass around bolts 4, between which bolts and the plow-beam $a$ the braces $n$ extend. A cleaner $y$ is mounted on the shaft or bolt $x$, which connects the parts $z$ of the two beams $u$, and for the purpose of holding the cleaner $y$ firmly in position the sleeve 12 is interposed between the ends of the cleaner $y$ on the bolt $x$. The cleaner is curved to approximately the shape of the periphery of the wheel $w$, which is concave, as shown, and serves to loosen and remove any soil that may stick to the periphery of said wheel.

The operation is obvious. After the plow-point has been adjusted to the desired depth and the covering-wheel has been similarly adjusted the plow is drawn through the field, opening a furrow. By means of sprocket-wheels $r$ and $t$ and the chain $s$ the seed is fed regularly and in measured quantities into the furrow formed by the plow, and the wheel $w$ closes the furrow above the seed.

Instead of providing the seedbox o with the particular form of discharge-spout q as shown in Fig. 1 it may be desirable to provide a means for the more direct distribution of the seed to the furrow, thus obviating the possibility of the seed being scattered over too much ground, and for this purpose I have provided the particular form of distributer shown in Figs. 3 and 4, in which the seedbox o is provided with the spout 13, opening into the conical or pyramidal shaped hopper 14, secured by means of the brackets 15 and 16 to the beams b and 17. It will be noted that the beam 17 is similar in construction to the beam u, but is made longer for the purpose of allowing the hopper 14 to be properly mounted out of the way of the wheel w. The bracket 16 is slotted, as at 18, to receive the end of the pointed shovel 19, which conveys the seed from the hopper directly to the furrow without scattering the same. This shovel 19 may be adjusted up or down by means of the set-screw 20 when desired.

Having thus described my invention, what I claim as new, and desire to secure by Letters Patent of the United States, is—

1. In a plow, the combination with a plow-beam, a frame secured thereto, bent arms pivoted at the forward end of said frame, provided with bolts adapted to clamp the two arms upon said plow-beam, and a plow-point carried by the lower end of said arms; of a second frame pivoted to the rear end of said first frame, a covering-wheel mounted in said second frame, plow-handles attached to said plow-beam, and a pair of curved slotted arms connected to said second frame, and adjustably secured to said plow-handles for elevating and depressing said wheel, substantially as described.

2. In a plow, the combination with a plow-beam, a frame secured thereto, bent arms pivoted at the forward end of said frame, provided with bolts adapted to clamp the two arms upon said plow-beam, and a plow-point carried by the lower end of said arms; of a second frame pivoted to the rear end of said first frame, a covering-wheel mounted in said second frame, a hopper carried by said plow-beam, a spout adapted to deliver seed before said covering-wheel, plow-handles attached to said plow-beam, and a pair of curved slotted arms connected to said second frame and adjustably secured to said plow-handles, substantially as described.

In testimony whereof I affix my signature in presence of two witnesses.

JOSEPH EDWARD SPRAIN.

Witnesses:
J. W. BAKER,
E. L. REED.